March 17, 1964 — P. E. E. A. HENRICOT — 3,125,302
LINERS FOR BALL AND TUBE MILLS Filed May 27, 1960 — 3 Sheets-Sheet 1

INVENTOR
PAUL EMILE E. A. A. HENRICOT
BY
ATTORNEYS

March 17, 1964  P. E. E. A. A. HENRICOT  3,125,302
LINERS FOR BALL AND TUBE MILLS Filed May 27, 1960  3 Sheets-Sheet 2

INVENTOR
PAUL EMILE E. A. A. HENRICOT
BY
ATTORNEYS

United States Patent Office 3,125,302
Patented Mar. 17, 1964

3,125,302
LINERS FOR BALL AND TUBE MILLS
Paul Emile Ernest Alfred Andre Henricot, 11 Rue Emile Henricot, Court-St.-Etienne, Belgium
Filed May 27, 1960, Ser. No. 32,309
11 Claims. (Cl. 241—183)

This invention relates to liners for ball and tube mills. In known art, the efficiency of said mills can be improved by use of a shape of shell liners which cause the balls in service to assume a regular lattice formation. It has been proposed to this end to use liners having on their inner surface integral studs separated from one another by intervals of such dimension that grinding media cannot reach the bottom of said intervals, said studs being so disposed that they impose throughout the mass of balls contacting them an orderly disposition corresponding to the maximum apparent density arrangement which would be attained if the real ball load were replaced by an ideal assembly of uniform diameter balls, equivalent for grinding purposes to the real load, the arrangement of studs being adapted to said ideal representative ball diameter.

Practical experience has demonstrated that a real milling charge composed of balls of varying diameters (which continually decrease by service wear, losses in weight being compensated by additions of bigger size new balls) performs economically for a certain period of time, i.e. that the mean equivalent diameter remains fairly constant. As soon as this constancy can no longer be maintained, performance deteriorates and the ball load has to be renewed.

In the above known disposition of studs along the apices of continuous networks of triangles or squares, the balls of an appropriate ideal ball load would pile up in superposed layers each of which is identical to the one just beneath it, but slightly shifted in plan view, since each sphere of any layer drops into a void in the underlying one.

In thus equipped mills, the top areas of the studs alone constitute the working or impact-receiving surface of the lining and the intervals between the studs form receiving cells which orderly dispose the incoming balls of the first layer. The studs also transmit to the incoming balls and consequently to the remaining balls the driving torque imposed to the shell which is to command their motion. Known studs continuously have corresponding parts of their top area thus stressed, which leads to systematically localised wear, however tough the stud material may be, be it achieved either by nature or by intrinsic work-hardening properties.

The present invention prevents these drawbacks by obtaining, thanks to a novel form and disposition of studs, a separation of the above functions, viz their repartition between diverse areas of the linear surface, and moreover by a current renewal of stress-exposed surfaces so as to equalize wear and offset its ill effects. Even the relatively few fixed studs exposed to directionally constant impact and wear action will take proportionately less importance among an assembly of unceasingly renewed surfaces.

According to the invention, instead of constituting the ordinating means commanding the lattice packing of the ball mass, the heads of a number of densely disposed studs of moderate dimension (often smaller than an average grinding ball) preferably more than 50% of said ordinating means are made up of actual balls which occupy places predestined for them in the voids between a small number of primary studs and interposed secondary ones. Thanks to this principle of liner construction, the primary studs now having greater distance between one another can be notably strengthened and above all strongly abutted on the liner base plate. In this new arrangement, the lateral surface of studs, which, in the known art, was not touched by the balls and thus could not acquire, by cold work under impact or pressure, an intrinsic hardness enhancing its abrasional resistance, now deeply plunge into the ball load and therefore can carry same along with greater strength. The head of said studs, whilst receiving the part of impact stresses previously allotted to each stud of a continuous layer, are relieved from the stress of mass-entraining, and will consequently hold better. On the other hand, since apart from the fixed primary studs, the major portion of the active grinding surface is now formed by mobile balls, these latter, alternating at each cycle, will always present fresh spherical surfaces. This is a distinct advantage over fixed studs which in a short time of service show wear or erosional flats, initiating disastrous slipping movements of mill contents. Preferably, the fixed studs have spherical heads with a radius approximating that of corresponding balls.

The load ordinating surface, which is normally the outer layer of moving balls, but might well be a more inwardly situated parallel layer, is formed by offering to oncoming balls the apposite lodgments in the intervals between primary studs, if at least the number of said primary studs is sufficient to impose the required arrangement. If not, secondary studs of smaller height and dimensions are distributed between primary studs so as to ensure correct ordinating surface disposition. By controlling the size of the intervals between primary and interposed secondary studs, the balls of ordinating layer arrange themselves substantially flush with the tops of neighbouring primary studs.

The secondary studs, while contributing in some measure to load entrainment, are less stressed than in known art from this cause, since an essential part of their lifting action is derived from lateral areas of primary studs. On the other hand, they are somewhat protected from the heaviest impact action of balls by their more elevated and bulkier neighbours, so that global resistance is heightened, safety of action enhanced, and hazards of slip and ensuing abrasion reduced.

Further details and particulars of the invention will appear from a description of the accompanying drawings in which are represented preferred embodiments of the invention, although it is to be understood that the invention is not restricted thereto.

Figure 11:
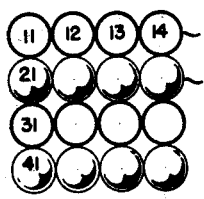
FIGURES 11–15 are schematic views showing the arrangements of primary studs and mobile grinding ball media according to FIGURES 1–5 but wherein the cells of the ordinating surface constitute lattices of equilateral rectangles or squares.
Figure 12:
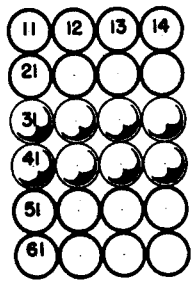
Figure 13:
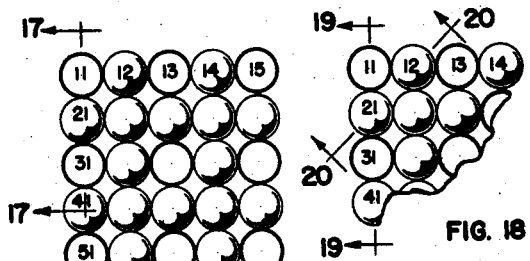
Figure 21:
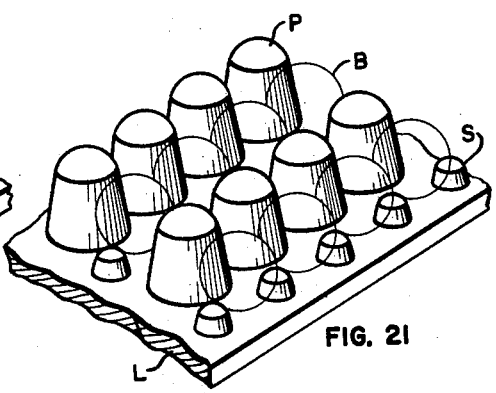

FIGURES 1–5 comprise schematic views to illustrate the disposition of fixed primary studs and mobile grinding ball media in the cells of an ordinating surface disposed as a lattice of equilateral triangles, FIGURE 1 representing one arrangement and FIGURES 2–5 representing modifications thereof;

FIGURE 21 illustrates in perspective the use of secondary studs in cooperation with the primary studs of the arrangement according to FIGURE 11 to align the ball media in their respective cells.

As is well known, the linings of ball mills are conventionally composed of circular assemblies of juxtaposed plates which cover the inner surface or shell of the grinding mill and house the grinding media and material to be comminuted. However, for ease and convenience in illustrating the invention, no attempt has been made in the aforesaid figures to represent the curved contour of the individual plates.

Now referring more specifically to the several views and first to FIGURES 1–5 considered in conjunction with FIGURES 6–10, the lining L of a ball mill is there illustrated as a lattice the cells of which are disposed in close assembly and to define equilateral triangles with adjacent cells. Certain of the cells in such lattices comprise fixed primary studs represented in FIGURES 6–10 as P; the remaining cells are mobile balls B from the charge of grinding ball media and comminuting material. In accordance with the invention the selection of those cells to comprise primary studs P and those to be filled by ball media B from the charge may take any one of several arrangements. FIGURES 1–5 represent five different arrangements that are practicable in accordance with the invention. In said figures, the locations of the cells are designated by index numbers comprising a precedent numeral and a subsequent numeral. The precedent numeral refers to the horizontal row starting from the top of the figure and the subsequent numeral refers to the vertical or oblique column starting from the left hand side. Thus in FIGURE 1 the number 23 designates a cell in the second row third column of the illustrated lattice. Those cells occupied by primary studs P are represented by heavy circles, and those cells to be occupied by balls B from the mill charge are represented by lighter drawn circles.

Figure 1:
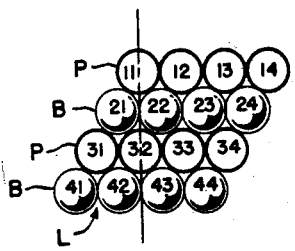
Figure 6:
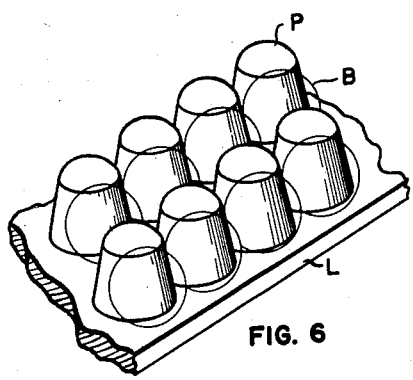
FIGURES 6–10 are fragmented schematic views of a ball mill liner drawn in perspective to illustrate each of the aforesaid arrangements and to show the secondary studs which cooperate with the primary studs to properly locate the grinding ball media in the appropriate cells of the lattices.

Turning therefore to the illustrated ordinating lattices, FIGURES 1 and 6 illustrates a lattice wherein the primary studs P occupy every other horizontal rows of the arrangement. Thus in FIGURE 1, the cells of these rows are designated 11, 12, 13, 14, 31, 32, 33 and 34. The even rows of cells 21, 22, 23, 24, 41, 42, 43 and 44 comprise the mobile grinding ball media B. In this arrangement which we identify as I, 50% of the lattice cells are occupied by mobile balls and 50% by primary studs. The studs, preferably, are conically shaped and have an outer spherical surface corresponding to that of the ball media. Their height or extent of projection from lining L is such that the ball media fill their designated cells (21, 22, 23, 24, 41, 42, 43, 44) so that the apices of the balls and studs are essentially level, or more correctly, tangent to a curved surface paralleling the surface of the lining L. Furthermore, the primary studs are located in this arrangement so close to each other that their sides outline the cells which receive the ball media and whereby the ball media are properly aligned in their respective cells.

Figure 2:
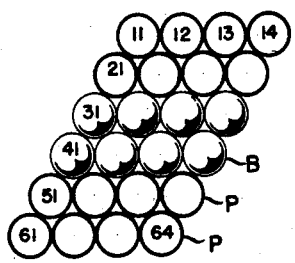
Figure 7:
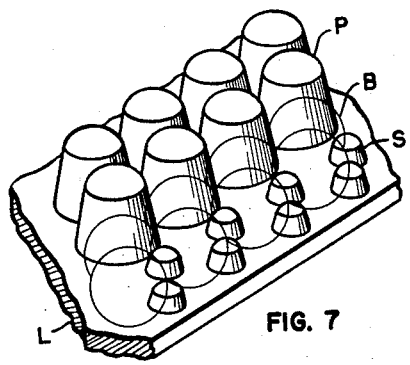

In other arrangements wherein there is a larger proportion of ball receiving cells to cells occupied by primary studs P, secondary studs S are provided to align and properly locate the ball media in their respective receiving cells and these are oriented with respect to cells occupied by the fixed primary studs P to accomplish this aligning function in cooperation with the primary studs. Thus in arrangements where rows of cells occupied by primary studs are separated by two or more rows of cells to be occupied by mobile ball media from the grinding mill charge, secondary studs are required to ensure correct ball disposition in said voids. FIGURES 2 and 7 illustrate an arrangement II wherein the lattice comprises an alternation of pairs of rows occupied by fixed primary studs and pairs of rows to be filled by ball media from the charge. Thus in these views, rows 1 and 2, 5 and 6 have their cells occupied by primary studs while rows 3 and 4 are occupied by mobile ball media. As illustrated by FIG. 7, the secondary studs have a much lesser height than the primary studs and are located at intervals between the ball media receiving cells rather than centered therein as are the primary studs in their respective cells. The shape and disposition of such secondary studs S are such as to permit reception of grinding ball media from the charge and to arrange them in the respective cells of rows 3 and 4, for example, so as to have their apices of the same height as the apices of the studs P and to complete the lattice arrangement, i.e., make the apices of the balls occupy the correct place in the center of each ball receiving cell.

Figure 3:
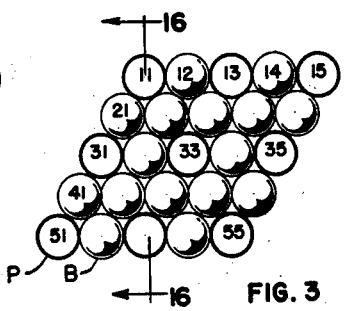
Figure 8:
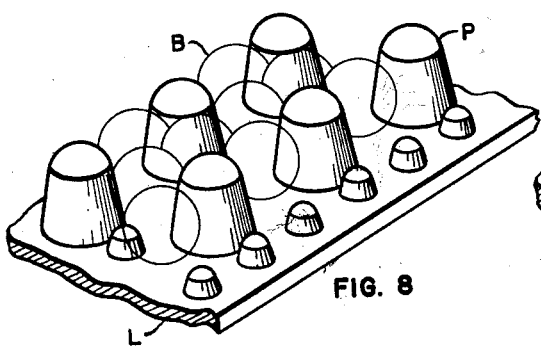
Figures 16, 17:
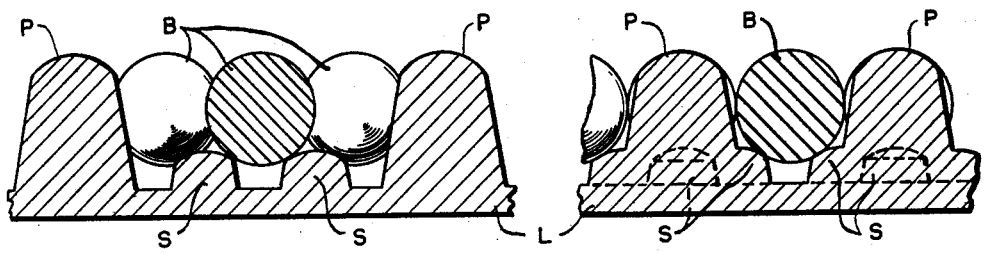
FIGURE 16 is a sectional view taken along lines 16—16 of FIGURE 3 to illustrate one form of secondary stud and its function to align the mobile grinding ball media in their appropriate cells.
FIGURE 17 is a sectional view taken along lines 17—17 of FIGURE 13 to illustrate an alternate arrangement of such secondary studs as clusters about a primary stud.

In FIGURES 3 and 8 an arrangement III is illustrated which is similar to arrangement I but wherein every other column of rows of studs are left open for reception of a mobile ball from the charge. Thus, for example, studs occupy cells 11, 13, 15, 31, 33, 35, 51, 53, 55 and the intervening cells 12, 14, 22 through 25, 32, 34 and 41 through 45 are left open to receive ball media from the grinding mill charge. In such an arrangement each ball comes under the aligning influence of two neighboring studs, i.e. in the triangle represented by studs 11, 31, 33, cells 21, 22 and 32 receive ball media. In this arrangement also, a secondary stud S is arranged in the gravital center of the triangle represented by cells 11, 31, 33 to assure correct positioning of the balls. One such stud to each triangle is sufficient as is illustrated in FIGURE 16.

Figure 4:
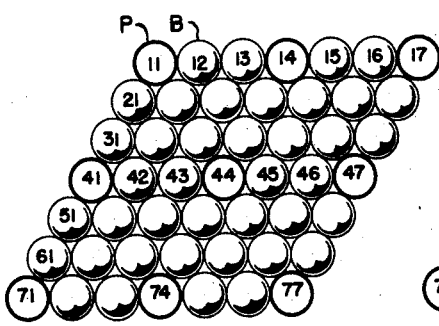
Figure 9:
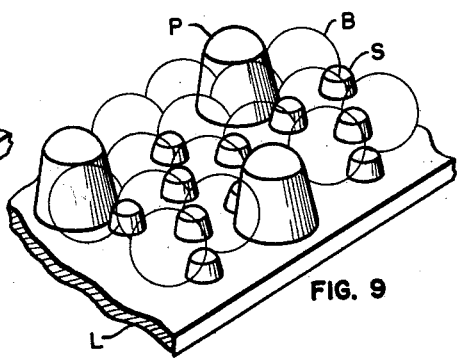

In arrangement IV as illustrated by FIGURES 4 and 9, only every third row contains studs and in these rows a stud is placed in every third cell. For example, in FIGURE 4, not only are all the cells of rows 2, 3, 5 and 6 left open to receive mobile ball media from the charge, but cells 12, 13, 15 and 16 of row 1, also cells 42, 43, 45 and 46 of row 4 and cells 72, 73, 75 and 76 or row 7 are also open to receive the ball media. In this arrangement, each primary stud P functions to retain 8 ball media.

Figure 5:
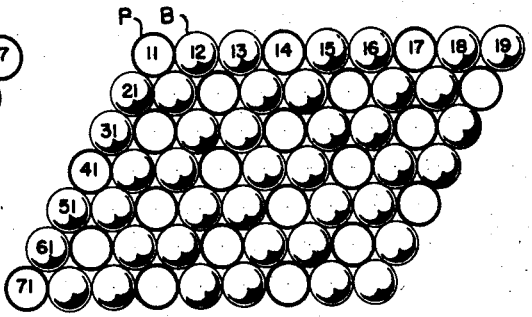
Figure 10:
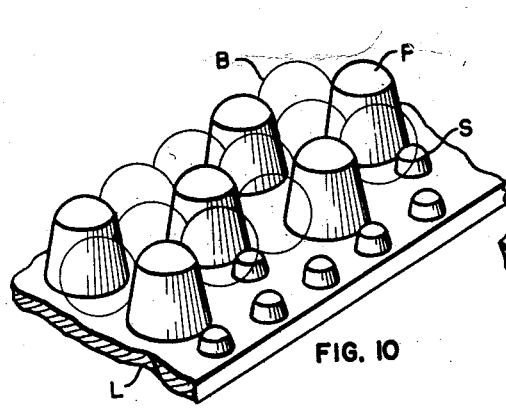

To reduce this ratio, an arrangement V may be provided as illustrated in FIGURES 5 and 10, where, in each row, every third cell contains a stud P, the studs of each row being offset one cell from the adjoining row, thus reducing the ratio to 1 stud for each 2 balls.

From FIGURES 1–5 and the above discussion thereof, it will be seen that the cells occupied by studs can be indicated mathematically by a formula in which $n$ will designate the vertical column of cells in the lattice, $p$ the horizontal row of said lattice, $j$ being the numeral 1 or 2 and $k$ and $i$ indicate a progression 0, 1, 2, 3, 4, 5, 6, etc. Thus the location of studs in each arrangement will be as follows:

Arrangement:

I _____ $n=2k+1$
$p=i+1$
II _____ $n=k+1$
$p=4i+j$
III _____ $n=1+2k$
$p=1+2i$
IV _____ $n=1+3k$
$p=1+3i$

In V if $(n_1p_1)$ $(n_2p_2)$ $(n_3p_3)$ refer to any three neighboring studs, then the indices of the studs to be inserted follow the formula $$\frac{n_1p_1 + n_2p_2 + n_3p_3}{3}, \text{etc.}$$

To illustrate if $n_1p_1$ refers to cell 11, $n_2p_2$ to cell 41 and $n_3p_3$ to cell 44, then $$\frac{11+41+44}{3} = \frac{96}{3} = 32$$

also if $n_1p_1$ refers to cell 11, $n_2p_2$ to cell 14 and $n_3p_3$ to cell 44, then $$\frac{11+14+44}{3}=\frac{69}{3}=23$$

In the area defined by cells 11, 41, 44 and 14, arrangement V is obtained by adding studs to cells 23 and 32 of arrangement IV.

FIGURES 11 through 15 are counterparts of the lattice arrangements of FIGS. 1 through 5, respectively, but related to squares, that is equal sided rectangles as opposed to the equal sides triangles of which the lattices of FIGURES 1 through 5 are comprised.

As previously noted, secondary studs S function to ordinately dispose such ball media from the charge as are required to complete the ordinating lattice represented above as either equi-sided triangles or rectangles. For this purpose, they are not arranged to correspond with the cells of the lattice but in the intervals between cells so as to locate the balls properly in the designated cells of the lattice. For this reason, and also because it is proposed to broaden the base of the primary studs into adjoining cells to afford strength and rigidity thereto, the secondary studs may be clustered around primary studs so that the surface of a liner may comprise clusters each including one primary stud and parts of several secondary studs. One such clustering arrangement is illustrated by FIGURE 17 which is assumed for sake of convenience to be a section taken along lines 17—17 of the lattice illustrated by FIGURE 13. In a lattice arrangement employing such a cluster, conceivably other secondary studs may also be dispersed between clusters as in arrangements where the primary studs are widely spaced, as for example, the arrangement IV illustrated by FIGURES 4 (triangular) and 14 (rectangular). The clusters of primary and secondary studs as illustrated by FIGURE 17 are particularly stolid and resistant to wear.

By the aforesaid arrangements, the occupancy of at least 50% of the cells in the lattices by grinding ball media from the grinding mill charge helps to relieve wear on the primary studs. This is true first because the replacement of primary studs with mobile balls means that at least half of the force of the charge is on the mobile balls and which by reason of their mobility do not continuously present the same surface portion to the wear of the charge. Secondly, the opening of the lattice to include cells to receive balls from the charge permits the retained primary studs to be more stolidly constructed as aforedescribed and therefore more resistant to wear. It is, however, also important to control wear on the secondary studs so that the wear thereon will proceed at a rate similar to the wear on the primary studs which nevertheless does occur in the open lattices including ball media, although to a less extent than where the cells are entirely occupied by fixed studs. This is necessary to maintain a constant shape pattern which the studs and ball media present to the charge in their ordinating function and thus to conserve overall efficiency in operation of the ball mill. There is, of course, an equalization factor to the extent that as wear becomes pronounced on the ends of the primary studs, the less worn balls would protrude beyond the ordinating surface which the ends of the studs define. However, wherever this occurs the wearing effect is concentrated on the higher protruding ball surfaces, so that there is an equalization of wear.

Figure 18:
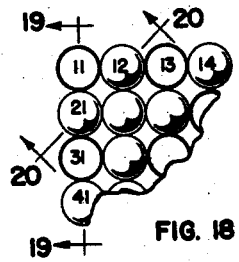
FIGURE 18 is a fragmented view of an arrangement similar to that illustrated by FIGURE 13 and FIGURES 19 and 20 are sectional views taken along lines 19—19 and 20—20, respectively, of FIGURE 18 to illustrate another form of secondary studs.
Figure 14:
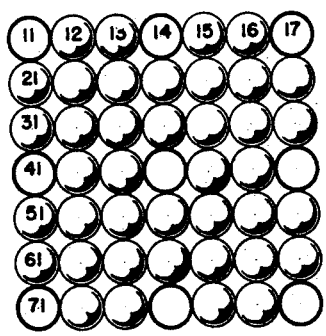
Figure 15:
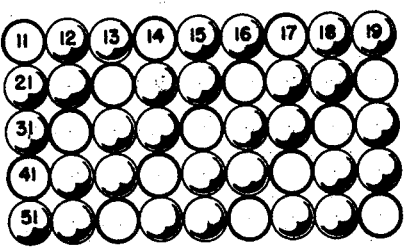
Figures 19, 20:
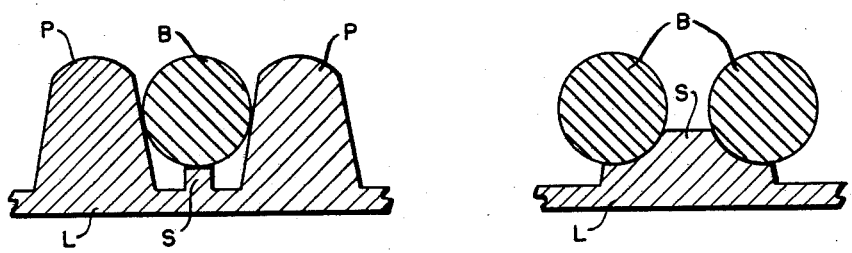

It, however, is also possible to utilize the mobile balls so as to transmit wear therethrough to the secondary studs, thus obtaining more uniform wear on all the constituents of the lining, that is on both the primary and the secondary studs. To this end, the secondary studs S' may be formed as lamellar cradles having a spherically curved surface of adequate transverse thickness approximating that of the ball which support the balls in the designated cells between the primary studs. Such a cradle type stud SP is illustrated by FIGURES 18, 19 and 20.

Such cradles may comprise either single curved receptacles or be arranged in groups around the primary studs.

It is to be understood that the invention is not limited to the exact embodiments shown, which are merely used to illustrate the invention and not so as to limit the same. For example, whereas the theoretical piling of successive layers of balls could only proceed correctly when starting from a plane liner, i.e., for a mill tube of infinite diameter, in a real mill, all network dimensions but those parallel to the mill axis become narrower when proceeding toward said axis. It is therefore considered to be within the limits of the invention to enlarge the size of those lattice elements not parallel to the mill axis in such a measure as will render possible a regular piling of a more inwardly situated concentric layer of balls.

Also, when applying the invention to a mill where classification of balls according to their sizes is brought about by means other than actual partitioning walls, network dimensions and dispositions should vary along the length of the mill so as to be in accordance with the size of balls presented at each location, the average ball thus to be computed, not on the total length of the tube, but in accordance with location conditions. These latter, by virtue of classification, are much more favorable due to the rational demixing of the load.

Such are two examples of variations in the form of the device. Other alternatives will, of course, be apparent to those skilled in the art and without departing from the spirit of the invention or the scope of the claims.

I claim:

1. A lining covering the inner side of a grinding mill utilizing ball media, said lining having regularly spaced primary studs which project inwardly toward the axis of the mill and voids therebetween into which a number of the ball media are received, the primary studs having a height such that each of the ball media received into said voids enter to essentially the level of the ends of the primary studs to form with the ends of the primary studs an ordinating surface for the remainder of the ball media, said ends of the primary studs further having a spherical surface the radius of which is substantially equal to the average of the ball media, and smaller secondary studs between the primary studs which coact with the primary studs to align the ball media received in said voids in accordance with a predetermined lattice which includes the ends of the primary studs.

2. A lining according to claim 1 wherein the ends of the primary studs are tangent to an imaginary surface considered parallel to the inner side of the mill from which the primary studs project.

3. A lining according to claim 1 wherein the voids between the primary studs and the height and repartition of the interlying secondary studs are so dimensioned that the apices of the primary studs and of the ball media received in the voids are at an equal distance from the axis of the mill through any transverse section thereof.

4. A lining according to claim 1 wherein the primary studs are spaced apart sufficiently as to permit more than one ball to be interposed between primary studs.

5. A lining according to claim 1 wherein the primary studs are of frusto-conical shape and the secondary studs are more slenderly dimensioned so as to promote equal progression of wear on both primary and secondary studs.

6. A lining according to claim 1 wherein the centers of the primary studs occupy the cells of a triangular lattice having a side dimension corresponding to a whole integer multiple of the average diameter of the ball media utilized.

7. A lining according to claim 1 wherein the centers of the primary studs occupy the cells of a square lattice having side dimensions corresponding to a whole integer multiple of the average diameter of the ball media utilized.

8. In a grinding mill containing a mixed load of grinding media and material to be comminuted, a liner assembly of closely fitting plates covering the inside surface of the mill, said plates carrying on their inside surface a plurality of arrays of regularly spaced studs, each array of studs varying from other arrays of studs in height, shape and disposition, said arrays of studs together constituting means for aligning the grinding media in a given pattern about the inside surface of the mill, one of said arrays of studs comprising primary studs having their ends of spherical shape and contacting an imaginary surface considered parallel to the inside surface of the mill, the ends of the primary studs constituting selected nodes of a regular lattice, other nodes of said lattice being open, and the other arrays of studs having lower height and dimensions than the primary studs and being so positioned in the spaces between and below the primary studs as to cause those grinding media which enter said spaces to so arrange themselves as to occupy the nodes left open in the regular lattice whereby the ends of the primary studs and center facing surface of said grinding media constitute an ordinating surface for the grinding load, the other arrays of studs having a height and being so positioned as to insure that the center facing surface of the grinding media and ends of the primary studs constituting the ordinating surface of the grinding load are substantially flush with each other and contact said imaginary surface considered parallel to the inside surface of the mill.

9. The liner assembly according to claim 8 wherein the mentioned other arrays of studs form symmetrical clusters integral with and about the primary studs.

10. The liner assembly according to claim 8 wherein the mentioned other arrays of studs which are of lower height and dimensions than the primary studs have concave surfaces which receive and locate the ball media in the cells left open in the regular lattice which include the ends of the primary studs.

11. A lining covering the inner side of a grinding mill utilizing ball media, said lining having regularly spaced studs which project inwardly toward the axis of the mill and voids therebetween into which a number of the ball media are received, the studs having a height such that each of the ball media received into said voids enters to essentially the level of the ends of the studs to form with the ends of the studs an ordinating surface for the remainder of the ball media which is tangential to the ends of said studs and the ball media received in the voids and is equidistantly spaced from the axis of the mill considered through any transverse section thereof, said lining further including means which align the ball media received in said voids in accordance with a predetermined regular lattice the cells of which are constituted by the ends of the studs and the ball media received in the voids, the ends of said studs having a spherical shape corresponding to the spherical shape of said ball media.

References Cited in the file of this patent
FOREIGN PATENTS

| | | |
|---|---|---|
| 143,232 | Australia | Sept. 5, 1951 |
| 1,140,441 | France | Mar. 4, 1957 |